Figure 1:
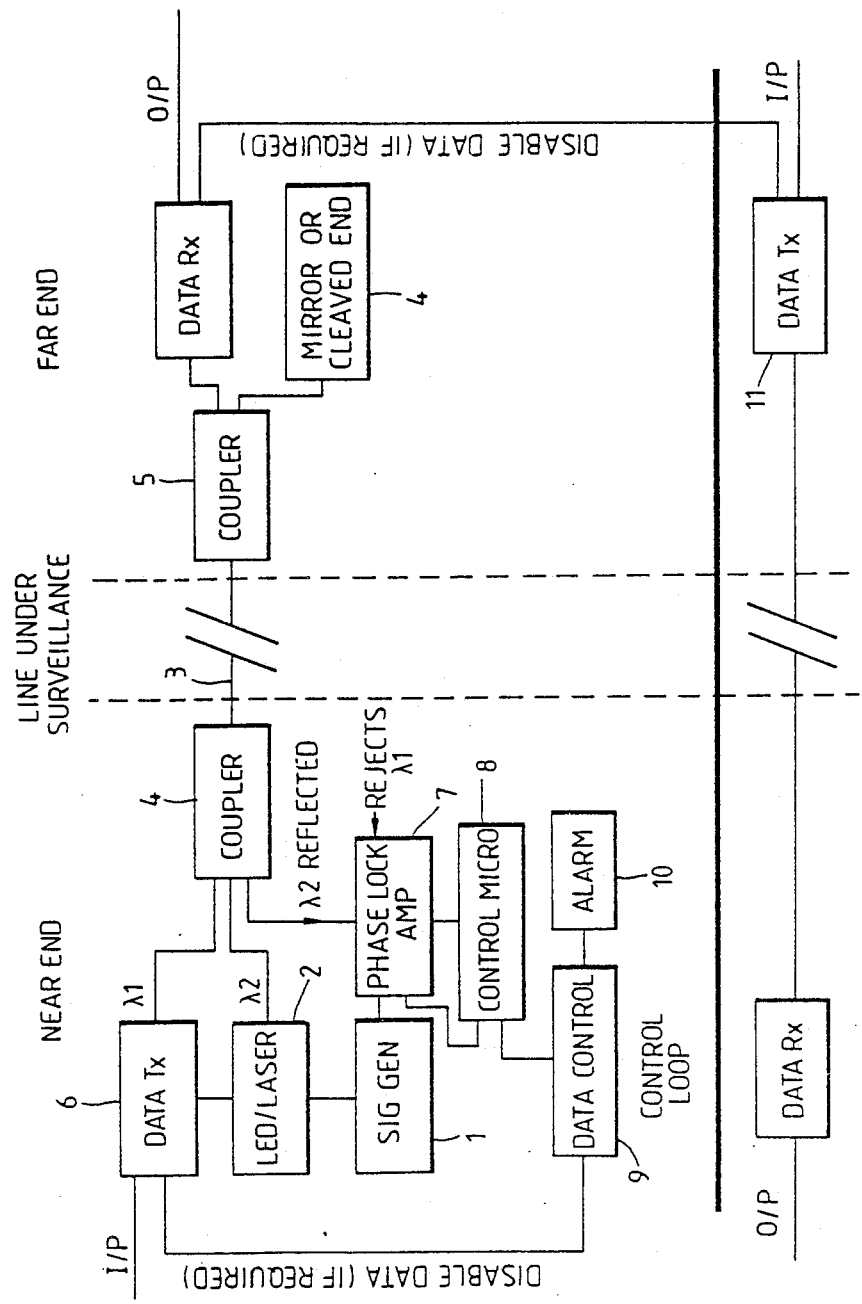

United States Patent [19]

Marsden

[11] Patent Number: 4,961,644
[45] Date of Patent: Oct. 9, 1990

[54] TRANSMISSION LINE SURVEILLANCE SYSTEM MEASURING CHANGES IN PHASE OF PROPAGATED SIGNALS

[75] Inventor: Stephen A. Marsden, Bury St Edmunds, England

[73] Assignee: British Telecommunications public limited company, Great Britain

[21] Appl. No.: 303,669

[22] PCT Filed: Apr. 27, 1988

[86] PCT No.: PCT/GB88/00327
§ 371 Date: Jan. 19, 1989
§ 102(e) Date: Jan. 19, 1989

[87] PCT Pub. No.: WO88/08651
PCT Pub. Date: Nov. 3, 1988

[30] Foreign Application Priority Data

Apr. 27, 1987 [GB] United Kingdom ................. 8709900

[51] Int. Cl.$^5$ .......................................... G01N 21/88
[52] U.S. Cl. ................................................ 356/73.1
[58] Field of Search ...................................... 356/73.1

[56] References Cited

U.S. PATENT DOCUMENTS

| | | | |
|---|---|---|---|
| 4,207,561 | 6/1980 | Steensma | 356/73.1 |
| 4,514,054 | 4/1985 | Stowe | 350/96.15 |
| 4,634,852 | 1/1987 | Shaw | 250/227 |
| 4,636,029 | 1/1987 | Johansson et al. | 350/96.16 |

FOREIGN PATENT DOCUMENTS 245340 10/1980 France .
2520114 7/1983 France .
53-28447 3/1978 Japan ................................. 356/73.1

OTHER PUBLICATIONS

IEEE Instrumentation and Measurement Conference, Mar. 25-27, 1986, Boulder, Colo., IEEE (New York, U.S.), P. Wendland: "Fiber optic measurements; A review of recent methodology", pp. 219-222a.
Patent Abstracts of Japan, vol. 4, No. 175, (E-36)(657) Dec. 3, 1980, & JP. A. 55120240 (Hitachi Seisakusho K.K.), Sept. 16, 1980.

Primary Examiner—Vincent P. McGraw
Attorney, Agent, or Firm—Nixon & Vanderhye

[57] ABSTRACT

A surveillance system in which a cyclically varying signal is launched into a data carrying optical fibre (3). The signal is reflected from the far end of the fibre and the returning signal compared with the launched signal. A change in the phase difference between the launched and returning signal is indicative of a change in length of the fibre. A microprocessor (8) is used to discount environmentally induced changes caused by temperature or traffic vibration. Alternatively the cyclically varying signal may also be transmitted to the far end of the fibre in digital form and after conversion used as the reference for comparison at the far end.

32 Claims, 2 Drawing Sheets

TRANSMISSION LINE SURVEILLANCE SYSTEM MEASURING CHANGES IN PHASE OF PROPAGATED SIGNALS

This invention relates to monitoring of optical fibres.

There are in existence surveillance systems for optical fibre networks operating on optical time domain reflectometry (OTDR) principles. In these systems a high power pulse is launched into the optical fibre, this pulse travels along the fibre and is scattered by crystal inhomogeneities in the fibre, some of the scattering being backwards along the fibre to the end from which the pulse was launched. At this launch end the returning backscattered light is monitored for a period following launch of the pulse. The returning backscattered light effectively constitutes a series of 'echoes' and it is possible to determine the power level of the pulse at a point on the fibre because the power level bears a relationship to the strength of the returning backscattered signal, and the time interval between launch of the pulse and the respective return 'echo' provides, from a presumption of the propagation time, an indication of the distance along the fibre from which the light is being scattered. Over a period of time a lowering in the echo strength related to a particular location on the fibre is indicative of power loss which may be indicative of unauthorised coupling out of light, but may also be caused by other factors. A disadvantage of using OTDR monitoring for surveillance is that the high power pulse sources required are costly and bulky. Also although power loss is detectable, the system does not provide an indication of unauthorised handling or proximity to transmission lines, for example for the purpose of sabotage, until actual damage occurs. It is also possible for power to be tapped and simultaneously injected without detection.

The present invention is concerned with providing a sensitive surveillance system that may also provide an early indication of unauthorised access to an optical fibre network.

Accordingly the invention provides a surveillance method comprising generating a cyclically varying signal, modulating an optical beam with said signal and launching the beam into an optical fibre, comparing at least part of the signal after transmission along the fibre with a reference signal related to the cyclically varying signal and monitoring phase changes in the cyclically varying signal occurring in transmission along the fibre.

Within the context of this specification the expression 'optical' is not restricted in its reference to the visible portion of the electromagnetic spectrum, and especially it includes the infra red and wavelengths transmittable by optical fibres.

Figure 2:
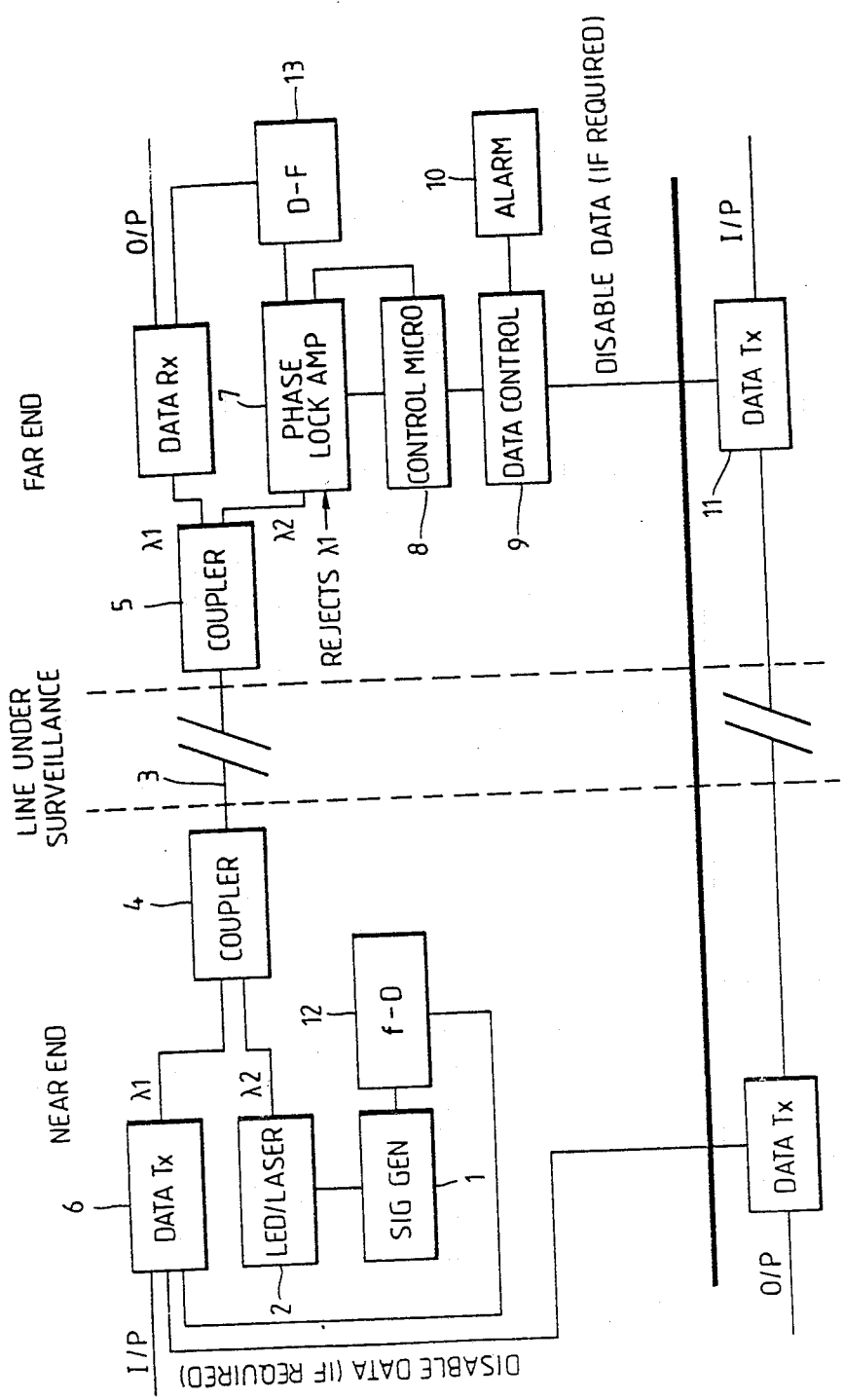

The invention is now described by way of example with reference to the accompanying drawings in which:

FIG. 1 is a schematic illustration of a first embodiment of the invention in which a surveillance signal is launched into a fibre and monitored from the launch end, and FIG. 2 is a schematic illustration of a second embodiment in which the surveillance signal is monitored at the end remote from the launch of the surveillance signal.

In local or short haul communication networks there is a demand for confidential transmission and it is this type of network that is the principle concern of the invention although it is envisaged that the system may be developed for longer haul applications. In a preferred embodiment a surveillance signal is generated and transmitted along the same path as the data signals. Any available transmission window may be used for the surveillance signal, for example the data transmission may use 1300 nm and the surveillance signal 1310 nm or data tansmissions may be spread around 1300 nm and the surveillance signal transmitted at 850 nm. The surveillance signal is constantly transmitted even when there is no data transmission.

The surveillance signal consists of a cyclically varying signal, for example a laser beam having a square or sinusoidally modulated amplitude. In fact the modulation may take any form in which phase difference or delay can be detected, and for a given maximum amplitude the shorter the modulation period the more sensitive it becomes to phase difference. This amplitude modulated signal is launched into the transmission fibre and propagates along the fibre until it is reflected back towards the launching end by the fibre termination at the far end of the fibre. The proportion of the surveillance signal that is reflected may be increased by providing a metallised coating on the fibre termination or by provision of a grating or other wavelength sensitive device that will selectively reflect the surveillance signal. At the launching end the returning surveillance signal is compared with the launched signal for phase difference and this phase difference provides a reference value. If the transmission path is elongated then the phase difference between the launched and returning signals changes and this change is significant even for minute elongation: picking up a single fibre or disturbing a fibre by blowing on it is sufficient to change the phase difference between the launched and returning surveillance signals at surveillance signal frequencies of the order of 200 MHz. Thus by monitoring for phase difference changes from the reference value an indication of change in length of the fibre transmission line can be detected and this may indicate disturbance of the line. In general it is envisaged that frequencies greater than 50 MHz will be used, preferably frequencies in excess of 100 MHz and less than 300 MHz.

Various factors other than disturbance may also cause changes in length of the fibre, for example thermal expansion and contraction and vibration caused by the environment such as the passage of traffic. In order to eliminate consideration of changes due to these factors the phase difference values are monitored by a microprocessor which revises the reference value taking into account changes in temperature, traffic flow conditions and other variations related to external conditions or following predictable patterns. For example, if ambient temperature increases this can be monitored directly or, as will be necessary if the change in temperature occurs at a part of the transmission line remote from the microprocessor or any related sensor, the microprocessor will take into account comparatively slow and steady changes in the phase and recognise this as a temperature variation pattern and revise the reference value. Likewise vibration patterns caused by traffic will be recognisable both from time of day expectation levels and from the magnitude of the shifts. In contrast to this in order to tap into a fibre transmission line it is necessary to expose the fibre in order to couple it to a tapping fibre and this operation necessarily disturbs the fibre to a much greater extent than mere vibration because the duct carrying the fibre package and the fibre package itself have to be opened up. This type of disturbance would not follow a recognisable or expected regular pattern and the microprocessor would shut down the communication channel or provide other indications that unusual tampering may have occurred. In some locations the vibration pattern caused by approach to the fibre without actual hand ling may be sufficiently different from normal ambient conditions to raise an alert condition. The sensitivity of the system may also be selected by choice of surveillance signal frequency, the higher the frequency the more sensitive the system, so that a particular level of disturbance is necessary for detection and this can eliminate consideration of small vibrations for example.

In the system described so far the surveillance signal has been transmitted along the same fibre as the data. In practice it is usual for a transmission line package to include several separate optical fibres and as these packages are sealed the whole package is disturbed when access to a component fibre is made, so that a surveillance signal carried by one fibre in a package provides surveillance for the whole package. The technique may also be utilised as just a disturbance monitor without data transmission. In some instances greater sensitivity may be achieved by reducing the extent of packaging around a portion of fibre so as to render it more sensitive to its environment, and especially to vibration caused by approach.

It may be desirable to monitor for phase change at the end of the line remote from launch by comparing the incoming surveillance signal with a reference signal that is locally generated or transmitted to that end along the same or a different route. With this modification surveillance of more than one span of fibre may be achieved at a central monitoring location.

In a single ended (launch end monitored) system the return signal may be transmitted along a different return fibre to the outbound signal.

Referring now to the drawings, FIG. 1 shows a first preferred embodiment of the invention. In this embodiment a surveillance signal is generated by a signal generator 1 and this signal modulates the output of an LED or laser source 2 which is launched into an optical fibre transmission line 3, via a coupler 4. The line 3 may be a fibre that is also carrying data signals (as shown) from a data transmission source 6 or a separate fibre for surveillance only. The signal launched into the fibre 3 propagates to the remote end of the transmission line where it is reflected or returned back into the fibre by reflector 4 which may be a mirror, cleaved end, loop and coupler or such like.

If the line 3 is also carrying data, then at the far end there is a second coupler 5 which splits the light with one output going to data decoding and the other to the reflector 4. The reflected signal returns via coupler 5 (when required) along the line 3 to coupler 4 from which it is then input to a phase lock amplifier 7. The data signal (when present) is at a different wavelength $\lambda_1$ from the surveillance signal $\lambda_2$, and $\lambda_2$ is rejected at the phase lock amplifier. The amplifier 7 also receives an input from the signal generator 1 and compares the phases of the original signal with the returning signal and inputs the comparison to a microprocessor 8. In the microprocessor the phase change or delay is analysed and if it is found to be indicative of tampering the microprocessor signals this to a data controller 9 which in turn generates an audible alarm signal from alarm 10 and transmits a 'disable data' signal to the data transmitter 6, along line 3 and to the far end where transmission from data transmitter 11 is also disabled. A feedback loop from the microprocessor inputs phase adjustment information due for example to thermal expansion or other memorised information.

FIG. 2 shows a system, again for simultaneous transmission of data and surveillance signal, in which the surveillance signal is monitored at the far end from launch. In this system the signal generator's signal is also input to a frequency to digital convertor 12 and transmitted at the data frequency. At the far end the data frequency signal splits and the signal generator frequency is recovered by a digital to frequency convertor 13 and this is input to the phaselocked amplifier 7 which also receives the surveillance signal from coupler 4. The comparison, microprocessor and data disable operate similarly to that explained with reference to FIG. 1.

The data disable signal may take several forms. It may comprise a specific signal or cessation of an all-clear signal. Likewise, on receipt of the data disable signal, the data transmsitter may either change or interrupt the data transmission.

I claim:
1. A surveillance method comprising the following steps:
 (a) generating a cyclically varying signal,
 (b) modulating an optical beam with said signal and launching the beam into an optical fibre,
 (c) comparing at least part of the signal after transmission along said fibre with a reference signal related to the cyclically varying signal so as to determine a phase difference,
 (d) later repeating said steps (a)-14 (c) to determine a further phase difference, and
 (e) determining the occurrence of changes in the phase of the cyclically varying signal occurring in transmission along the fibre in response to said determined phase differences.

2. A surveillance method according to claim 1 in which at least part of the cyclically varying signal is reflected back to the launching end of the fibre and is compared with the reference signal at the launching end.

3. A surveillance method according to claim 1 or claim 2 in which the reference signal comprises the cyclically varying signal prior to transmission along the fibre.

4. A surveillance method according to claim 1 in which the cyclically varying signal is digitally encoded, transmitted to the end of the fibre remote from the launching end and decoded to provide the reference signal, and the comparison and monitoring takes place at the end of the fibre remote from the launch end.

5. A surveillance method according to any preceding claim 1 or 2 in which the cyclically varying signal comprises a substantially continuously varying amplitude modulated signal.

6. A surveillance method according to any preceding claim 1 or 2 in which in the event of phase changes exceeding a predetermined level information data transmitted over a transmission line under surveillance is disabled.

7. A surveillance method according to any preceding claim 1 or 2 in which in the event of phase changes exceeding a predetermined level a warning signal is generated.

8. A surveillance method according to any preceding claim 1 or 2 in which the optical beam is provided by an electroluminescent semiconductor device.

9. A surveillance method according to any preceding claim 1 or 2 in which the cyclically varying signal has a frequency of at least 100 MHz.

10. A surveillance method according to any preceding claim 1 or 2 in which phase changes consequent on environmental patterns are automatically discounted.

11. A surveillance apparatus of the type which surveys an optical fiber transmission path, said apparatus comprising:
generating means for generating a cyclically varying signal,
means coupled to said generating means and to said optical fiber transmission path for modulating an optical beam with said cyclically varying signal and for coupling the modulated beam into said optical fiber transmission path,
comparing means coupled to said optical fiber transmission path for receiving at least portion of the signal after propagation of said signal along at least a portion of said optical fiber transmission path, and for comparing the phase of said received signal portion with the phase of a reference signal related to the cyclically varying signal so as to determine phase differences, and
means coupled to said comparing means for determining, in response to the results of plural such phase comparisons by said comparing means, the occurrence of phase difference changes between the phase of said cyclically varying signal and the phase of said reference signal.

12. Apparatus for detecting tampering with an optical fiber transmission path, said apparatus comprising:
a transmitter coupled to said optical fiber transmission path, said transmitter coupling light modulated by a cyclically varying signal into said optical fiber transmission path, said modulated light propagating along said path;
a receiver coupled to said optical fiber transmission path, said receiver receiving a portion of said propagated modulated light; and
processing means, coupled to said receiver, for continually monitoring the phase of said propagated modulated light, for detecting changes in said monitored phase over time, and for generating an output signal indicating said optical fiber transmission path has been tampered with in response to unexpected detected phase changes over time.

13. Apparatus as in claim 12 wherein said processing means includes means for generating said output signal only if a detected phase change exceeds a predetermined change.

14. Apparatus as in claim 12 wherein said processing means includes means for adapting to gradual changes in the condition of said optical fiber transmission path.

15. Apparatus as in claim 12 wherein said modulated signal is at a first frequency and said transmitter further includes means for injecting a data signal at a second frequency different from said first frequency into said optical fiber transmission path.

16. Apparatus as in claim 15 wherein said optical fiber transmission path has a first end and a second end, said transmitter and receiver are both coupled to said optical fiber transmission path first end, and said apparatus further includes frequency selective reflecting means, coupled to said optical fiber transmission path second end, for reflecting said first frequency signal and for passing said second frequency signal.

17. Apparatus as in claim 12 further including means, operatively coupled to said transmitter and to said processing means, for disabling said transmitter in response to said output signal.

18. Apparatus as in claim 12 wherein said transmitter constantly applies said signal to said optical fiber transmission path.

19. A surveillance method comprising generating a cyclically varying signal having a modulation frequency of at least 50 MHz, modulating an optical beam with said signal and launching the beam into an optical fibre, comparing at least part of the signal after transmission along the fibre with a reference signal related to the cyclically varying signal and monitoring phase changes in the cyclically varying signal occurring in transmission along the fibre.

20. A surveillance method for an optical fibre transmission system, the method having a sensitivity great enough to detect remotely the non-damaging handling of an optical fibre which is under surveillance, the method comprising generating a cyclically varying signal, modulating an optical beam with said signal and launching the beam into said optical fibre, comparing at least part of the signal after transmission along said fibre with a reference signal related to the cyclically varying signal and monitoring phase changes in the cyclically varying signal occurring in transmission along said fibre.

21. A surveillance method for an optical fibre transmission system, the method comprising generating a cyclically varying signal having a modulation frequency of at least 50 MHz, modulating an optical beam with said signal and launching the beam into an optical fibre, comparing at least part of the signal after transmission along said fibre with a reference signal related to the cyclically varying signal and monitoring phase changes in the cyclically varying signal occurring in transmission along said fibre, the surveillance method being capable of detecting remotely the non-damaging handling of said optical fibre merely from monitoring said phase changes.

22. A surveillance method according to any one of the preceding claims 19–21 in which at least part of the cyclically varying signal is reflected back to the launching end of the fibre and is compared with the reference signal at the launching end.

23. A surveillance method according to any one of the preceding claims 19–21 wherein at least part of the cyclically varying signal is reflected back to the launching end of the fibre from a remote end of the fibre and that part is compared with the reference signal at the launching end.

24. A surveillance method according to any one of the preceding claims 19–21 in which the reference signal comprises the cyclically varying signal prior to transmission along the fibre.

25. A surveillance method according to any one of the claims 19–21 in which the cyclically varying signal is digitally encoded, transmitted to the end of the fibre remote from the launching end and decoded to provide the reference signal, and the comparison and monitoring takes place at the end of the fibre remote from the launch end.

26. A surveillance method according to any preceding claim 19–22 in which the cyclically varying signal comprises a substantially continuously varying amplitude modulated signal.

27. A surveillance method according to any preceding claim 19–21 in which in the event of phase changes exceeding a predetermined level, information data transmitted over a transmission line under surveillance is disabled.

28. A surveillance method according to any preceding claim 19–21 in which in the event of phase changes exceeding a predetermined level, a warning signal is generated.

29. A surveillance method according to any preceding claim 19–21 in which in the optical beam is provided by an electroluminescent semiconductor device.

30. A surveillance method according to any preceding claim 19–21 in which the cyclically varying signal has a frequency of at least 100 MHz.

31. A surveillance method comprising generating a cyclically varying signal, modulating an optical beam with said signal and launching the beam into an optical fibre, comparing a non-backscattered signal which corresponds with at least part of the signal after transmission along the fibre with a reference signal related to the cyclically varying signal and monitoring phase changes in the cyclically varying signal occurring in transmission along the fibre.

32. An intruder alarm system for an optical fibre communication system comprising:
an optical waveguide;
first means to generate a cyclically varying signal;
second means to modulate an optical beam with said signal;
third means disposed adjacent and optically coupled to one end of said waveguide to inject an optical beam so modulated into said one end of said waveguide for transmission to the other end thereof;
fourth means to compare at least part of the signal after transmission along the fibre with a reference signal related to the cyclically varying signal; and
fifth means for monitoring phase changes in the cyclically varying signal which occur in transmission along the fibre and for providing an alarm function in the event of phase changes exceeding a predetermined level.

* * * * *